United States Patent
Shirley

(10) Patent No.: US 9,593,929 B2
(45) Date of Patent: Mar. 14, 2017

(54) TURKEY MEASUREMENT DEVICE

(71) Applicant: Charles A. Shirley, Louisville, KY (US)

(72) Inventor: Charles A. Shirley, Louisville, KY (US)

(73) Assignee: Charles A. Shirley, Louisville, KY (US)

( * ) Notice: Subject to any disclaimer, the term of this patent is extended or adjusted under 35 U.S.C. 154(b) by 142 days.

(21) Appl. No.: 14/729,224

(22) Filed: Jun. 3, 2015

(65) Prior Publication Data
US 2016/0123713 A1 May 5, 2016

Related U.S. Application Data

(60) Provisional application No. 62/075,438, filed on Nov. 5, 2014.

(51) Int. Cl.
*G01B 5/02* (2006.01)
*G01B 3/04* (2006.01)
*A01K 29/00* (2006.01)

(52) U.S. Cl.
CPC .............. *G01B 5/02* (2013.01); *A01K 29/00* (2013.01); *G01B 3/04* (2013.01)

(58) Field of Classification Search
CPC .................................. G01B 5/02; G01B 3/04
USPC .......................................................... 33/511
See application file for complete search history.

(56) References Cited

U.S. PATENT DOCUMENTS

| | | | | |
|---|---|---|---|---|
| 2,148,651 | A * | 2/1939 | Scholl | A43D 1/02 33/3 A |
| 5,040,307 | A * | 8/1991 | Dotson | A63B 67/068 33/483 |
| 6,217,077 | B1 * | 4/2001 | Priebe | G01B 3/02 281/38 |
| 6,415,521 | B1 * | 7/2002 | Schnell | A01K 97/00 33/485 |
| 6,429,391 | B1 | 8/2002 | Gruver | |
| 6,647,635 | B1 | 11/2003 | Banfield | |
| 6,765,155 | B1 * | 7/2004 | Gray | G01B 3/04 177/148 |
| 6,959,499 | B2 * | 11/2005 | Bini | A01K 97/00 33/511 |
| 8,713,812 | B2 * | 5/2014 | Launius, Jr. | G01B 3/30 33/193 |
| 2006/0119095 | A1 * | 6/2006 | Heffernon | A01K 29/00 283/48.1 |
| 2007/0245583 | A1 * | 10/2007 | Tindall | A61B 5/1072 33/511 |
| 2007/0261709 | A1 * | 11/2007 | Bakus | A45D 44/00 132/214 |
| 2013/0167391 | A1 * | 7/2013 | Pratinidhi | A43D 1/02 33/512 |
| 2014/0041244 | A1 * | 2/2014 | Madril | G01B 3/002 33/562 |

OTHER PUBLICATIONS http://www.gobblergauge.com/Home_Page.php, Jun. 2, 2015.

* cited by examiner

*Primary Examiner* — Christopher Fulton
(74) *Attorney, Agent, or Firm* — White and Williams LLP

(57) ABSTRACT

A device for measuring turkey beard length and turkey spur length, including a beard stop, a beard ruler, one or more apertures sized to accommodate a turkey foot, and a spur ruler.

6 Claims, 4 Drawing Sheets

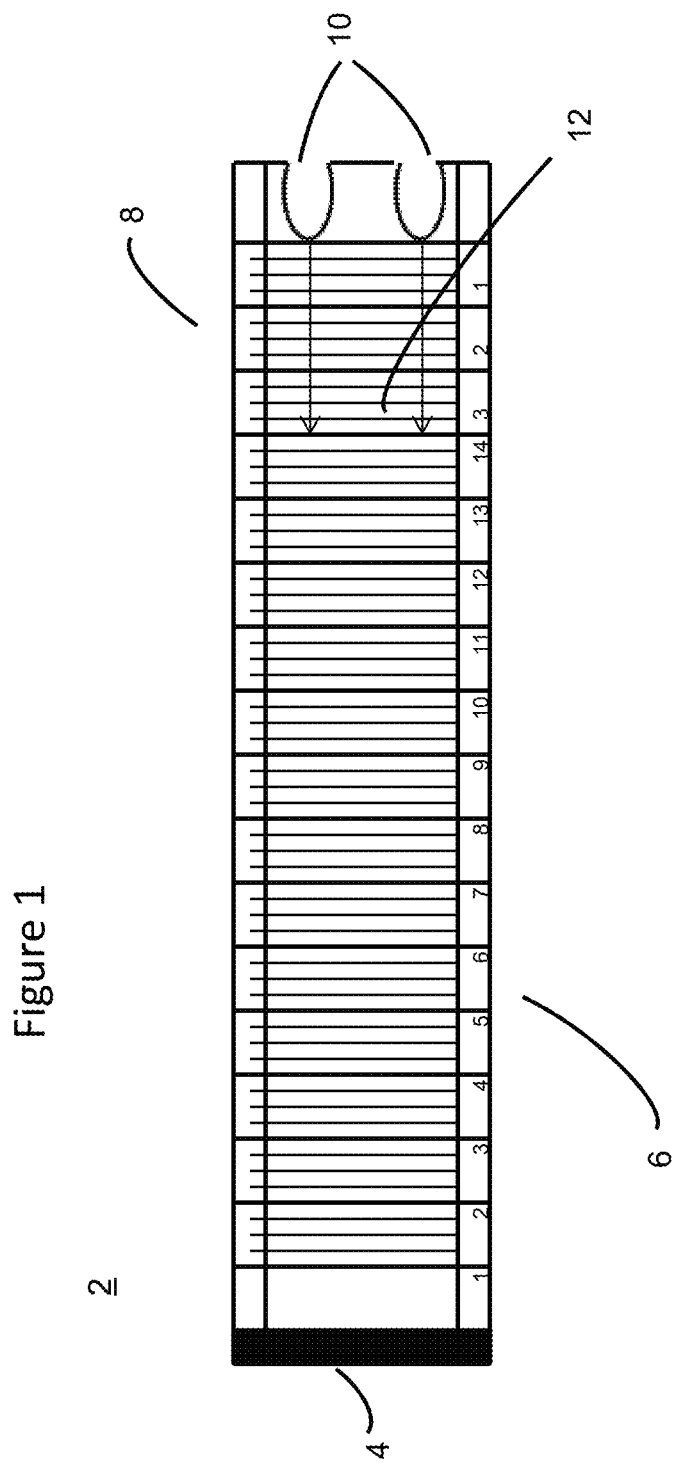

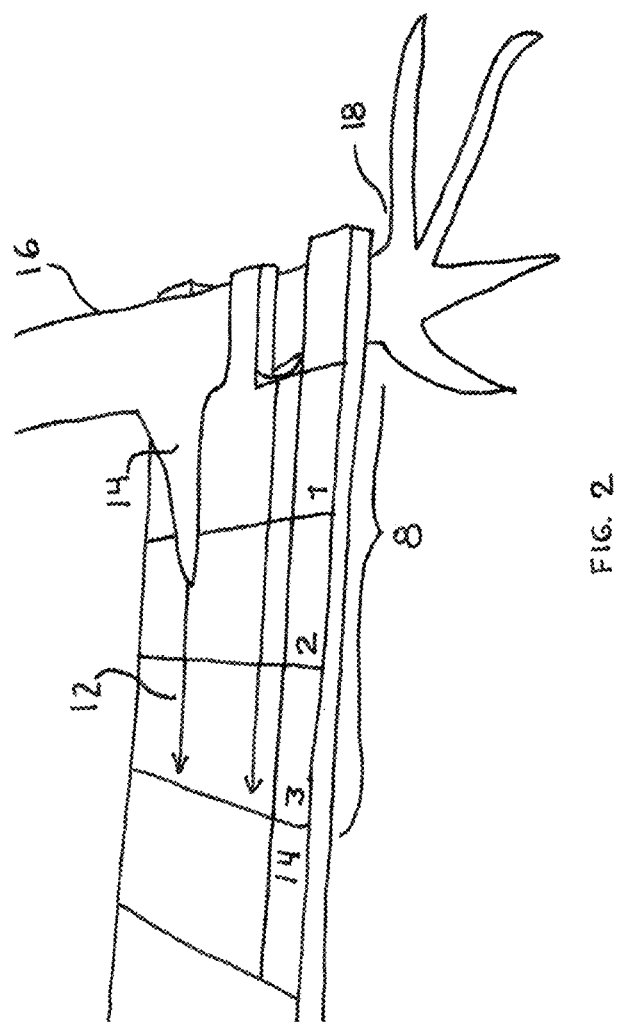

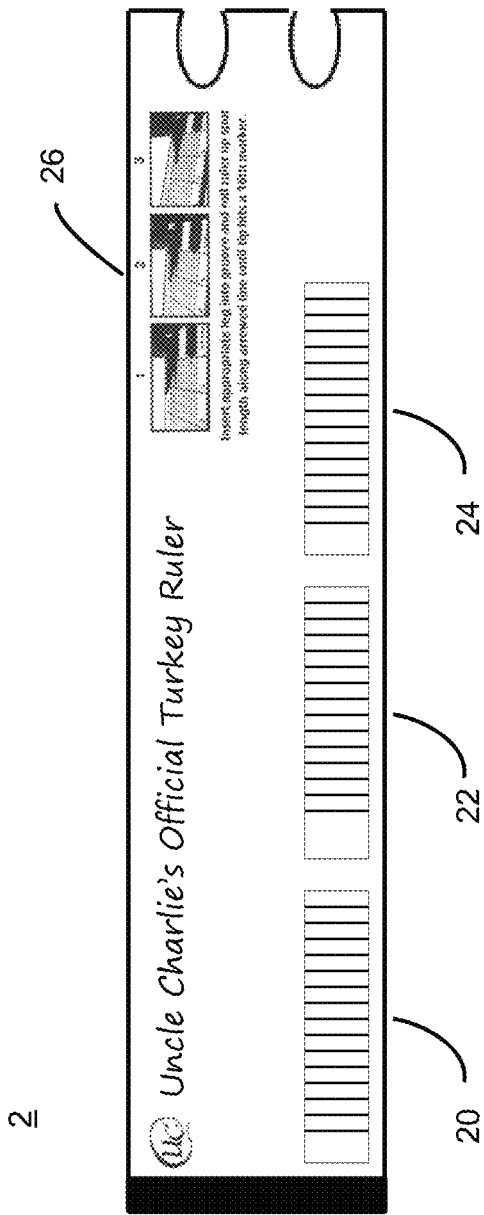

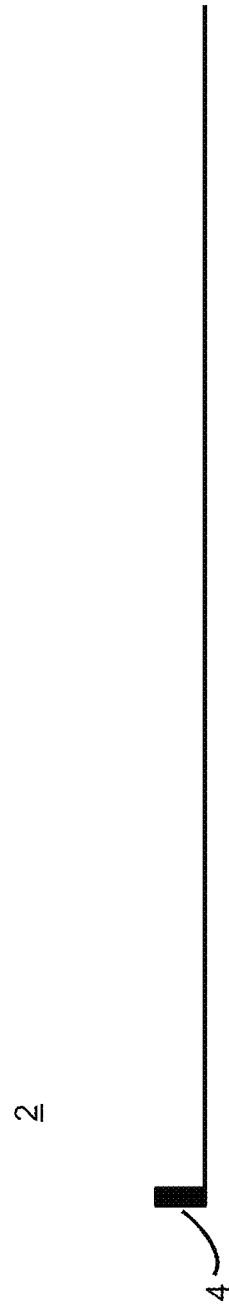

TURKEY MEASUREMENT DEVICE

CROSS-REFERENCE TO RELATED APPLICATIONS

This application claims the benefit of U.S. Provisional Patent Application No. 62/075,438, filed Nov. 5, 2014 and entitled "Turkey Measurement Device," which is incorporated herein by reference in its entirety.

BACKGROUND

The National Wild Turkey Federation (NWTF) maintains a register allowing turkey hunters to record measurable statistics such as turkey weight, spur length, and beard length for individually hunted turkeys. It can be cumbersome or difficult to acquire turkey spur length and beard length using measurement devices such as conventional rulers or tape measures. Therefore, it is desirable to have a device that allows a user to measure both turkey spur and beard length.

Other game measurement devices are shown in U.S. Pat. Nos. 6,429,391 and 6,647,635.

BRIEF DESCRIPTION OF THE DRAWINGS

FIG. 1 is a top view of the turkey measurement device of the present disclosure.

FIG. 2 is a perspective view of a portion of the turkey measurement device of the present disclosure.

FIG. 3 is a bottom view of the turkey measurement device of the present disclosure.

FIG. 4 is a side view of the turkey measurement device of the present disclosure.

DETAILED DESCRIPTION OF THE INVENTION

FIG. 1 is a top view of. the turkey measurement device 2 of the present disclosure. As shown in FIG. 1, the turkey measurement device 2 may include beard stop 4, beard ruler 6, spur ruler 8, foot notches 10, and spur guidelines 12.

Turkey Beard Measurement

As shown in FIG. 1, beard stop 4 and beard ruler 6 may be used to measure turkey beard length. The turkey beard (not shown) may be removed from the turkey and may retain a protrusion of skin, known as a beard root. The turkey beard may be measured from the center point of the beard root to the ends of the hairs. Using the turkey measurement device 2 of the present disclosure, the user may place the beard root (not shown) against beard stop 4 and arrange the hairs of the beard along beard ruler 6. Beard stop 4 helps secure the beard from sliding off the turkey measurement device 2 and provides a back stop for measurement. In one aspect, beard ruler 6 may be read left-to-right. In one aspect, beard ruler 6 may be a 14-inch ruler beginning at beard stop 4 and may have measuring lines at intervals, such as 1 inch, ¼ inch, ¹⁄₁₆ inch, etc. Once the user has placed the beard root against the beard stop 4, the user may pull the beard taut, holding the beard tip flat against beard ruler 6 to measure the beard length. In some cases, users may not include outlier or straggler hairs in the measurement.

Turkey Spur Measurement

As shown in FIG. 1, spur ruler 8, foot notches 10 and spur guidelines 12 may be used to measure turkey spur length.

In one aspect, spur ruler 8 may be a 3-inch ruler beginning at closed end of foot notches 10 and may have measuring lines at intervals, such as 1 inch, ¼ inch, ¹⁄₁₆ inch, etc. In one aspect, foot notches 10 may extend 1-inch from the end of the turkey measurement device 2 and may be approximately ½ inch wide. In one aspect, spur ruler 8 may be read from right-to-left.

FIG. 2 shows measurement of a spur using the turkey measurement device 2 according to one aspect of the invention of the present disclosure. At least one turkey foot 16 may be placed in foot notch 10 so the spur 14 extends over the spur ruler 8. Turkey foot toes 18 may be arranged on a flat surface generally facing away from the turkey measurement device 2. Spurs 14 may grow at angle from the turkey feet 16 and may be curved or bent. Depending on the size, shape, and angle of the spur 14 in relation to the foot 16, the user may raise or pivot the turkey measurement device 2 while maintaining the position of the turkey foot 16 so the spur 14 is flat against spur ruler 8. The size and shape of the turkey measurement device 2, specifically the foot notches 10 may be built to accommodate the turkey foot 16 while the turkey measurement device 2 is raised or pivoted in a manner that allows the spur 14 to be pressed flat against spur ruler 8. In one aspect, foot notches 10 may have at least partially rounded edges to better accommodate turkey foot 16 when the turkey measurement device 2 is pivoted. Spurs 14 may be measured along the outside center of the spur 14, from the point at which the spur 14 protrudes from the scaled foot skin to the tip of the spur 14.

The spur may be arranged along spur guidelines 12 for reference. Spur guidelines 12 may be located on the turkey measurement device 2 extending from the end center of each foot notch 10 along spur ruler 8.

In one non-limiting example, the turkey measurement device 2 of the present disclosure may be 18½ inches long, 3 inches wide and ½ inch thick with exception of the beard stop. The beard stop may be located on the left side of the ruler and may be 1 inch long, 3 inches wide and 1 inch thick. The turkey measurement device 2 may be constructed to be formed of one or more components and may be made of any number of materials, for example, wood, plastic, metal or metal alloy. It will be understood that the turkey measurement device 2 may be rectangular or another shape, such as square or circular.

In another aspect, the turkey measurement device 2 of the present disclosure may include tables and text to aid in the decimal conversion of measurements taken and may include a pictorial description of correct spur measurement as shown in FIG. 3. In one non-limiting example, decimal conversions for turkey weight, spur length and beard length may be presented on the bottom view of the turkey measurement device 2 at areas designated 20, 22, and 24. Accordingly, a three-step, pictorial tutorial 26 showing how to accurately measure spur length may be presented on the turkey measurement device 2.

Those skilled in the art will understand the other measurement systems, e.g., metric, may be presented as well.

The invention claimed is:

1. A device for measuring turkey beard length and turkey spur length, comprising:
    a beard ruler having beard length measurement distance markings beginning at a distal end of the beard ruler;
    a beard stop extending from the distal end of the beard ruler, the beard stop indicating a zero point of the beard length measurement distance markings;
    a spur ruler having spur length measurement distance markings beginning at a proximal end of the beard ruler;

one or more apertures sized to accommodate at least a portion of turkey foot at the proximal end of the beard ruler, the apertures indicating a zero point of the spur length measurement distance markings.

2. The device of claim 1, further comprising:

a spur guideline extending from the one or more apertures in a direction perpendicular to the spur length measurement distance markings.

3. The device of claim 1, wherein the beard length measurement distance markings and the spur length measurement distance markings are linearly aligned.

4. The device of claim 1, wherein the device is rectangular, and the beard stop and the one or more apertures are on opposite sides of the device.

5. The device of claim 1, wherein the device is rectangular and substantially flat except for the beard stop.

6. The device of claim 1, wherein a portion of the one or more apertures is rounded to accommodate a portion of a turkey foot below a spur.

\* \* \* \* \*